United States Patent
Fountain et al.

(10) Patent No.: US 12,367,553 B2
(45) Date of Patent: Jul. 22, 2025

(54) DATA PROCESSING APPARATUS, DATA PROCESSING METHOD, AND DATA PROCESSING SYSTEM

(71) Applicant: TELEXISTENCE INC., Tokyo (JP)

(72) Inventors: Jade Fountain, Tokyo (JP); Yusuke Mizushina, Tokyo (JP)

(73) Assignee: Telexistence Inc., Tokyo (JP)

( * ) Notice: Subject to any disclaimer, the term of this patent is extended or adjusted under 35 U.S.C. 154(b) by 136 days.

(21) Appl. No.: 18/286,912

(22) PCT Filed: Apr. 26, 2022

(86) PCT No.: PCT/JP2022/018831
§ 371 (c)(1),
(2) Date: Oct. 13, 2023

(87) PCT Pub. No.: WO2022/230854
PCT Pub. Date: Nov. 3, 2022

(65) Prior Publication Data
US 2024/0202877 A1  Jun. 20, 2024

(30) Foreign Application Priority Data

Apr. 28, 2021 (JP) ................................ 2021-075776

(51) Int. Cl.
*G06T 5/50* (2006.01)
*G06T 7/70* (2017.01)
*G09G 5/377* (2006.01)

(52) U.S. Cl.
CPC .............. *G06T 5/50* (2013.01); *G06T 7/70* (2017.01); *G09G 5/377* (2013.01); *G06T 2207/20221* (2013.01)

(58) Field of Classification Search
CPC ... G06T 5/50; G06T 7/70; G06T 2207/20221; G06T 11/60; G09G 5/377; B25J 13/06;
(Continued)

(56) References Cited

U.S. PATENT DOCUMENTS

2016/0288318 A1* 10/2016 Nakazato ............... B25J 9/1666
2020/0163731 A1  5/2020 Itkowitz et al.

FOREIGN PATENT DOCUMENTS

JP  2011189431 A  9/2011
JP  2014065100 A  4/2014

OTHER PUBLICATIONS

Machine English translation of the Written Opinion of the International Searching Authority from the priority application PCT/JP2022/018831, mailed on Jul. 26, 2022.
(Continued)

*Primary Examiner* — Ryan R Yang
(74) *Attorney, Agent, or Firm* — MEAGHER EMANUEL LAKS GOLDBERG & LIAO. LLP

(57) ABSTRACT

A data processing apparatus is disclosed which processes data for operating a movable segment of a machine in correspondence with a position of a controller. The data processing apparatus includes a control unit or processor configured to obtain controller information including the position, when an operator operates the movable segment using the controller, obtain capture image data generated by image capturing of the movable segment while the movable segment is operated in correspondence with the position, generate composite image data by superimposing a controller image indicating the position included in the controller information, on an area corresponding to the movable segment on the capture image data, and display the composite image data on a display device viewable by the operator.

13 Claims, 9 Drawing Sheets

(58) Field of Classification Search
CPC ......... B25J 3/00; B25J 9/1697; G06F 3/0304; G06F 3/0346; G06F 3/04815; G06F 3/04847; H04N 21/4131; H04N 21/4223; H04N 21/4316; H04N 21/431; H04Q 9/00; H04Q 2209/40
See application file for complete search history.

(56) References Cited

OTHER PUBLICATIONS

International Search Report from the priority application PCT/JP2022/018831, mailed on Jul. 26, 2022.

\* cited by examiner

DATA PROCESSING APPARATUS, DATA PROCESSING METHOD, AND DATA PROCESSING SYSTEM

TECHNICAL FIELD

The present disclosure relates to a data processing apparatus, a data processing method, and a data processing system.

BACKGROUND

JP2020-040155 discloses a technique of operating a robot using a controller attached to an operator by remote control, and displaying a capture image generated by an image capture device provided for the robot, on a terminal used by the operator who operates the robot.

SUMMARY

In the case where an operator operates a robot while viewing a capture image around a machine such as a robot, the operator cannot view the controller at hand. Therefore, there have been problems that, since it is difficult for the operator to recognize the position and orientation of the controller and the positions and orientations of movable segments of the machine at the same time, the operator cannot operate the machine easily.

The present disclosure has been made taking this point into account, and an object of the present disclosure is to provide a data processing apparatus, etc. which make it possible for an operator of a machine such as a robot to operate the machine using a controller easily.

A data processing apparatus according to an aspect of the present disclosure processes data for operating a movable segment of a machine in correspondence with a position of a controller. The data processing apparatus includes a control unit configured to obtain controller information including the position, when the operator operates the movable segment using the controller, obtain capture image data generated by image capturing of the movable segment while the movable segment is operated in correspondence with the position, generate composite image data by superimposing a controller image indicating the position included in the controller information, on an area corresponding to the movable segment on the capture image data, and display the composite image data on a display device viewable by the operator.

According to the present disclosure, a data processing apparatus, etc. which make it possible for an operator of a machine such as a robot to operate the machine using a controller easily are provided.

DETAILED DESCRIPTION

Figure 1:
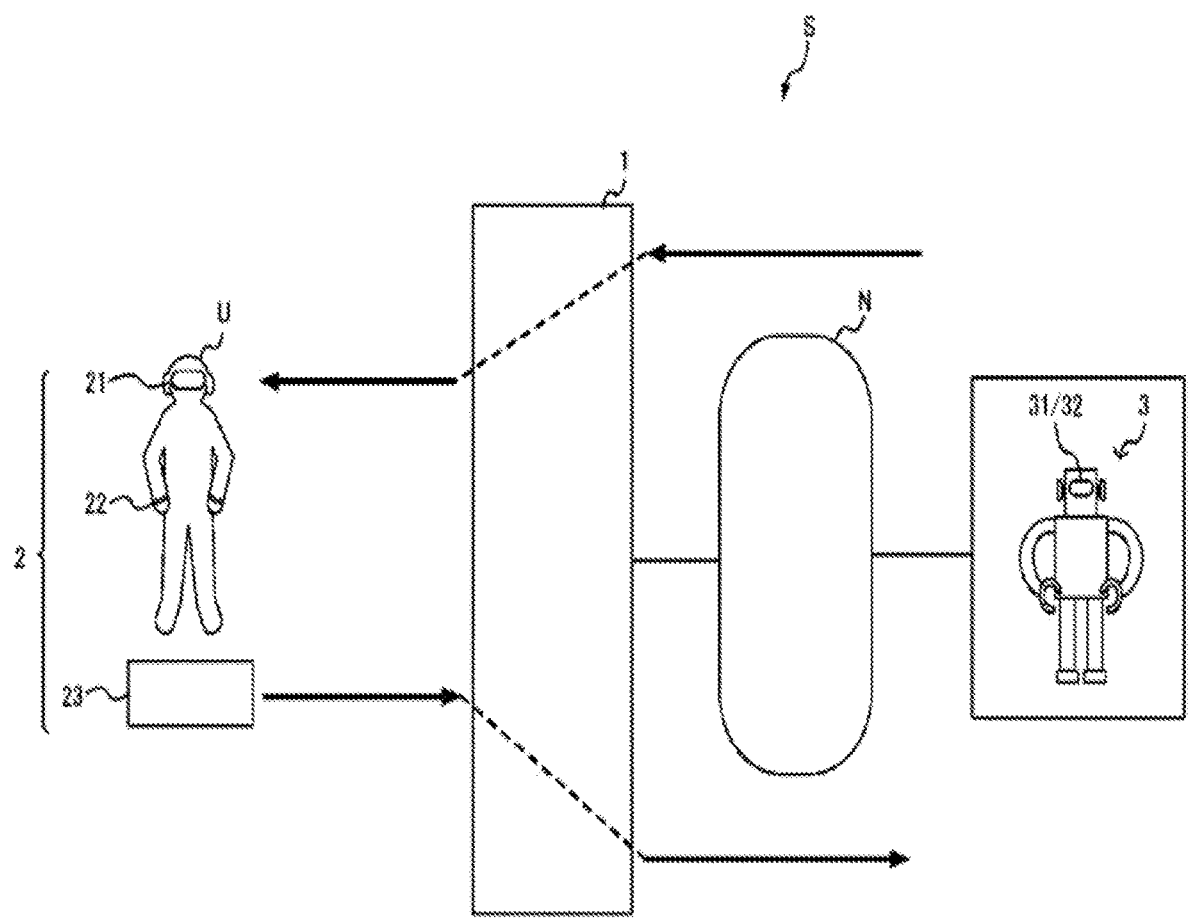
FIG. 1 is a diagram showing the overview of a data processing system.

FIG. 1 is a diagram showing the overview of a data processing system S. For example, the data processing system S is a system which provides a telexistence environment where an operator U can operate an object at a remote location in real time while the operator U can feel as if the object were located nearby.

The data processing system S includes a data processing apparatus 1, an operation controller 2, and a robot 3. The data processing apparatus 1 is an apparatus for controlling the robot 3 in correspondence with operation of the operator U performed at the operation controller 2. For example, the data processing apparatus 1 is a computer. The data processing apparatus 1 may be provided in a room where the operator U or the robot 3 is present. Alternatively, the data processing apparatus 1 may be provided at a position which is different from the position where the operator U is present and the position where the robot 3 is present.

The operation controller 2 is a device attached to the operator U. The operation controller 2 includes a display device 21, the operation device 22, and a communication unit 23. The display device 21 includes a display (display unit) for displaying an image based on composite image data generated by the data processing apparatus 1. The image on the display is viewable by the operator U. For example, the display device 21 is in a form of goggles. For example, the image displayed on the display device 21 is a celestial image corresponding to 360 degrees (all directions).

The robot 3 is operated based on control data received from the data processing apparatus 1 through the network N. The robot 3 is a machine operated by an operator U by remote control. The robot 3 includes an image capture device for generating capture image data (hereinafter referred to as the "camera 31"), and an image transmission unit 32 for transmitting the capture image data generated by the camera 31 to the data processing apparatus 1. Further, the robot 3 has movable segments such as a head, hands, and arms, operated in correspondence with movement of the operation controller 2. The movable segments of the robot 3 are operated synchronously with the position and orientation and the operation controller 2.

Further, the robot 3 transmits robot status data to the operation controller 2 through the data processing apparatus 1. The robot status data includes at least any one of haptic data indicating a sense of touch detected by the robot 3, sound data indicating a sound collected by the robot 3, or joint state data indicating a state of joints of the robot 3. As an example, in a store where a large number of products arranged on racks are sold, the robot 3 according to the present embodiment performs a task of arranging products on the racks in correspondence with operation of the operator U. However, the location where the robot 3 is provided and what tasks the robot 3 performs are not limited.

The data processing apparatus 1 obtains capture image data generated by the robot 3 which capture images in front of the robot 3 using the camera 31, and displays the obtained capture image data on the display device 21 of the operation controller 2. When the operator U wears the display device 21, the operator U cannot view the operation controller 2 at hand. Therefore, the data processing apparatus 1 superimposes a controller image indicating the position and orientation of the operation device 22 on the capture image data generated by the camera 31 to generate composite image data. The data processing apparatus 1 displays the composite image data on the operation controller 2. Thus, it is possible to improve operability of the operator U.

The display device 21 has a sensor for detecting an angle of the display device 21 relative to a reference orientation (hereinafter also referred to as the "device angle"). For example, the reference orientation is an orientation of the display device 21 in a state where the display device 21 is attached to the operator U oriented in a predetermined orientation. For example, the reference orientation is an orientation when operation of the display device 21 is started, or when the display device 21 is reset. The display device 21 detects an angle difference between the reference orientation and the orientation of the display device 21 as the device angle. The device angle of the display device 21 is represented, for example, by combination of two angles in a spherical coordinate system in three dimensional space.

The display device 21 generates head operation data indicating the device angle of the display device 21 relative to the reference orientation. The display device 21 notifies the head operation data to the communication unit 23 at predetermined time intervals. The predetermined time interval is defined, for example, based on the velocity at which the robot 3 can change the angle of the head of the robot 3. The greater the velocity at which the robot 3 can change the angle of the head of the robot 3 becomes, the shorter the predetermined time interval becomes. Since the time interval at which the display device 21 notifies the device angle corresponds to the velocity at which the robot 3 can change the angle of the head of the robot 3, there is no need to detect the device angle at a frequency higher than necessary. Therefore, it is possible to suppress power consumption of the operation controller 2.

The operation device 22 (controller) is a device used by the operator U to operate hands and arms of the robot 3, and has sensors for detecting movement of the hands and arms of the operator U. The operation device 22 generates hand/arm operation data indicating the movement of the hands and arms of the operator U. The operation device 22 notifies the generated hand/arm operation data to the communication unit 23. The operation device 22 may accept operation to move the robot 3 back and forth or left and right. Further, the operation device 22 also has elements for generating heat, pressure or vibration, etc. in correspondence with the state of the robot 3 to enable the operator U to sense the state of the robot 3.

The communication unit 23 has a communication controller which transmits operation data based on operation content by the operator U to the data processing apparatus 1 and receives composite image data from the data processing apparatus 1. The communication unit 23 synchronizes, for example, head operation data notified from the display device 21 and hand/arm operation data notified from the operation device 22. Further, the communication unit 23 transmits operation data including the synchronized head operation data and hand/arm operation data to the data processing apparatus 1 at predetermined time intervals. Further, the communication unit 23 inputs the composite image data received from the data processing apparatus 1 to the display device 21. The communication unit 23 may transmit operation data for moving the robot 3 forward, backward, leftward, or rightward to the data processing apparatus 1. The communication unit 23 may be included in either the display device 21 or the operation device 22, or the communication unit 23 may be placed in a casing which is different from the display device 21 and the operation device 22.

The robot 3 changes the orientation of the head of the robot 3 to the same angle as the angle of the display device 21, based on control data of the head. The control data of the head has been generated by the data processing apparatus 1 based on the head operation data transmitted from the operation controller 2. Further, the robot 3 moves the hands and arms of the robot 3 in the same manner as the hands and arms of the operator U, based on the hand/arm control data. The hand/arm control data has been generated by the data processing apparatus 1 based on the hand/arm operation data transmitted from the operation controller 2.

For example, the camera 31 is provided on the head, and generates capture image data of a range including movable segments of the robot 3 by capturing images in front of the robot 3. Further, the camera 31 may be an image capture device provided separately from the robot 3 at a position where it is possible to capture a range including the movable segments of the robot 3. The image transmission unit 32 includes a communication controller for transmitting the capture image data through the network N. While FIG. 1 illustrates a case where the camera 31 has the image transmission unit 32, the position where the image transmission unit 32 is provided is not limited.

Hereinafter, the process flow in the data processing system S will be described briefly with reference to FIG. 1. As described above, the operation controller 2 generates operation data in correspondence with movement of the head, hands, and arms of the operator U, and transmits the operation data to the data processing apparatus 1.

The data processing apparatus 1 generates control data for operating the robot 3 based on operation data, and transmits the control data to the robot 3. The robot 3 operates based on the control data received from the data processing apparatus 1. Further, after the robot 3 operated based on the control data received from the data processing apparatus 1, the robot 3 may transmit feedback information (e.g., ACK information) indicating that the robot 3 operated according to the control data, to the data processing apparatus 1. While the robot 3 is in operation, the robot 3 transmits the capture image data generated by the camera 31 to the data processing apparatus 1 at predetermined time intervals (e.g., every 5 milliseconds).

The data processing apparatus 1 transmits the composite image data generated by superimposing the controller image indicating the position and the orientation of the operation device 22 on an area corresponding to a movable segment (e.g., an arm of the robot 3) on the capture image data generated by the camera 31, to the operation controller 2. The display device 21 displays the composite image data received from the data processing apparatus 1. In this manner, even in the case where the user U cannot view the operation device 22 at hand, since the user can recognize the movable segments of the robot 3 and the controller image corresponding to the operation device 22 in the capture image data, the user can operate the robot 3 easily.

Figure 2:
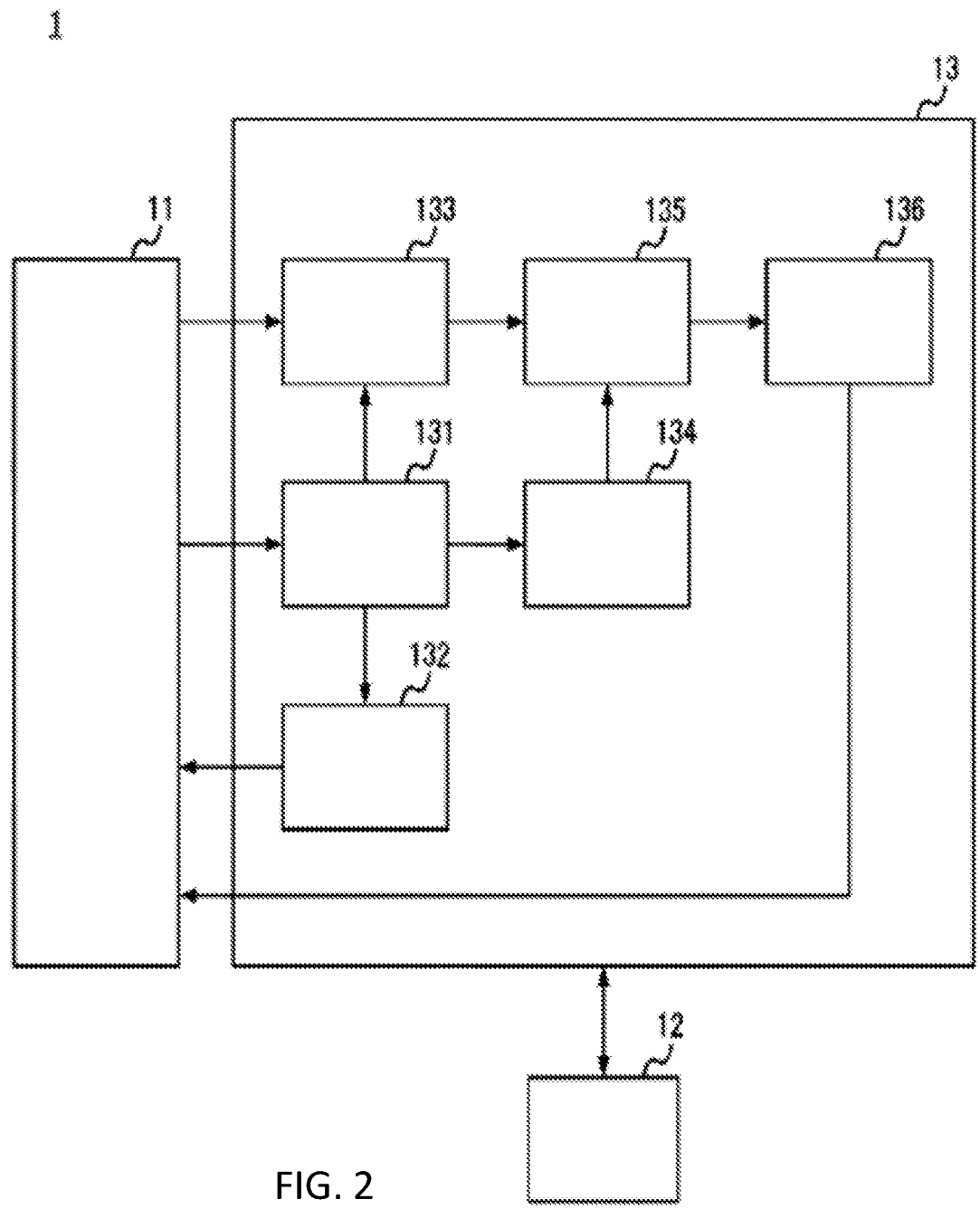
FIG. 2 is a diagram showing structure of a data processing apparats.

FIG. 2 is a diagram showing structure of the data processing apparatus 1. The data processing apparatus 1 includes a communication unit 11, a memory unit 12, and a control unit 13. The control unit 13 includes a controller information acquisition unit 131, an operation control unit 132, an image data acquisition unit 133, an identification unit 134, a composition unit 135, and a display control unit 136.

The communication unit 11 has a communication interface for transmitting various items of data between the operation controller 2 and the robot 3 through the network N. The communication unit 11 inputs operation data received, e.g., from the operation controller 2, to the controller information acquisition unit 131. Further, the communication unit 11 inputs capture image data received from the robot 3, to the image data acquisition unit 133. Further, the communication unit 11 transmits the control data inputted from the operation control unit 132 to the robot 3. Further, the communication unit 11 transmits the composite image data inputted from the display control unit 136 to the operation controller 2.

The memory unit 12 has a storage medium such as ROM (Read Only Memory), RAM (Random Access Memory) and SSD (Solid State Drive). The memory unit 12 stores programs to be executed by the control unit 13. The memory unit 12 also temporarily stores the capture image data received from the robot 3.

For example, the control unit 13 includes a CPU (Central Processing Unit) as a processor. The control unit 13 executes programs stored in the memory unit 12, to function as the controller information acquisition unit 131, the operation control unit 132, the image data acquisition unit 133, the identification unit 134, the composition unit 135, and the display control unit 136.

Hereinafter, the process performed by the data processing apparatus 1 will be described below. The process of operating the hands and the arms of the robot 3 using the operation device 22 by the operator U will be described below. Additionally, the operator U may operate the head of the robot 3 using the display device 21 in parallel.

Figure 3:
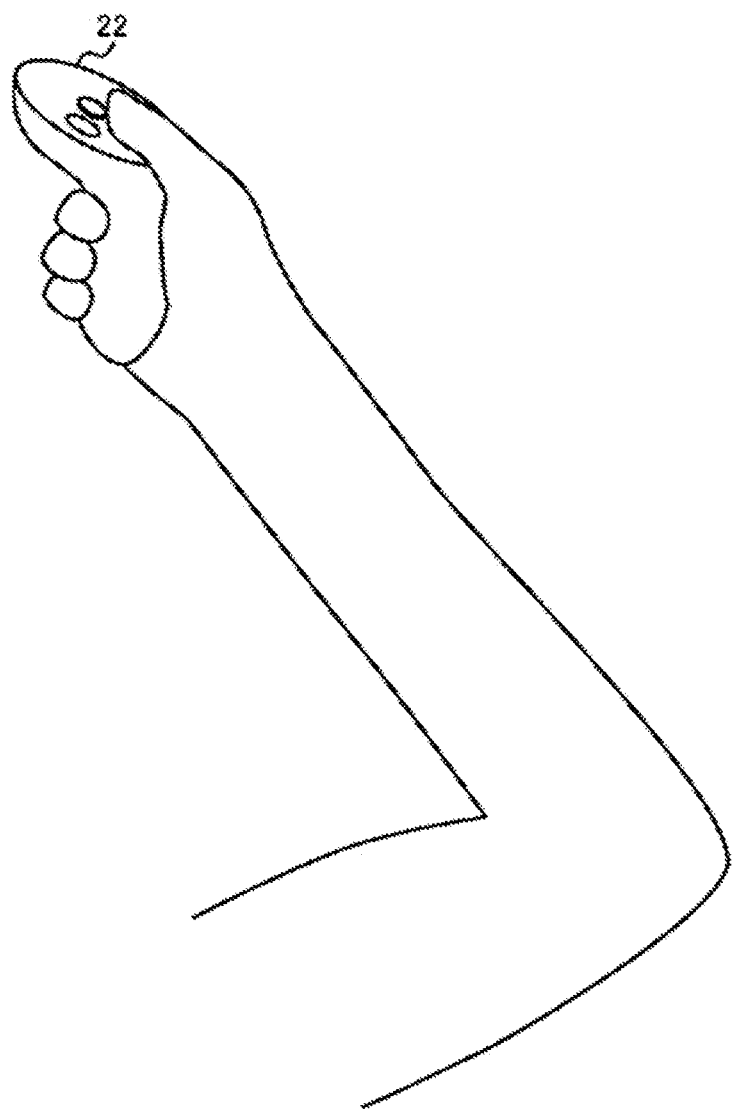
FIG. 3 is a schematic view illustrating an operation device.

The controller information acquisition unit 131 obtains the controller information including the position and orientation of the operation device 22 when the operator U operates the movable segments of the robot 3 using the operation device 22 (controller). FIG. 3 is a schematic view illustrating the operation device 22. The controller information acquisition unit 131 receives hand/arm operation data from the operation device 22 through the communication unit 11, and obtains the received hand/arm operation data as the controller information including the position and orientation of the operation device 22. Further, the controller information may include information indicating whether one or a plurality of buttons of the operation device 22 have been pressed or not. The controller information acquisition unit 131 inputs the obtained controller information to the operation control unit 132, the image data acquisition unit 133, and the identification unit 134.

The operation control unit 132 generates control data for operating the robot 3 based on controller information inputted from the controller information acquisition unit 131. The control data is information indicating the amount of movement or rotation when the movable segment of the robot 3 moved or rotated, or the orientation of the movable segment of the robot 3 (i.e., vector). For example, the operation control unit 132 may generate control data by adding or subtracting a predetermined correction value to or from a value indicated by the control information. The operation control unit 132 transmits the generated control data to the robot 3 through the communication unit 11.

While the movable segments of the robot 3 are operated in correspondence with the position and orientation of the operation device 22, the image data acquisition unit 133 obtains capture image data generated by image capturing of the movable segments of the robot 3 by the camera 31. The image data acquisition unit 133 inputs the obtained capture image data to the composition unit 135.

The identification unit 134 identifies the computational position and orientation of the movable segment of the robot 3 based on the position and orientation of the operation device 22 included in the controller information. For example, the position of the movable segment is a position of the wrist of the robot 3. For example, the orientation of the movable segment is the orientation of the fingertip relative to the position of the wrist of the robot 3. The identification unit 134 calculates the computational position and orientation of the movable segment of the robot 3 by, for example, successively adding or subtracting the amount of movement or rotation and orientation (i.e., vector) of the movable segment indicated by the control data generated by the operation control unit 132 to or from a predetermined initial position of the movable segment of the robot 3. The identification unit 134 may not perform the method specifically described herein. The identification unit 134 may identify the computational position and orientation of the movable segment of the robot 3 corresponding to the position and orientation of the operation device 22 by other methods.

Figure 4:
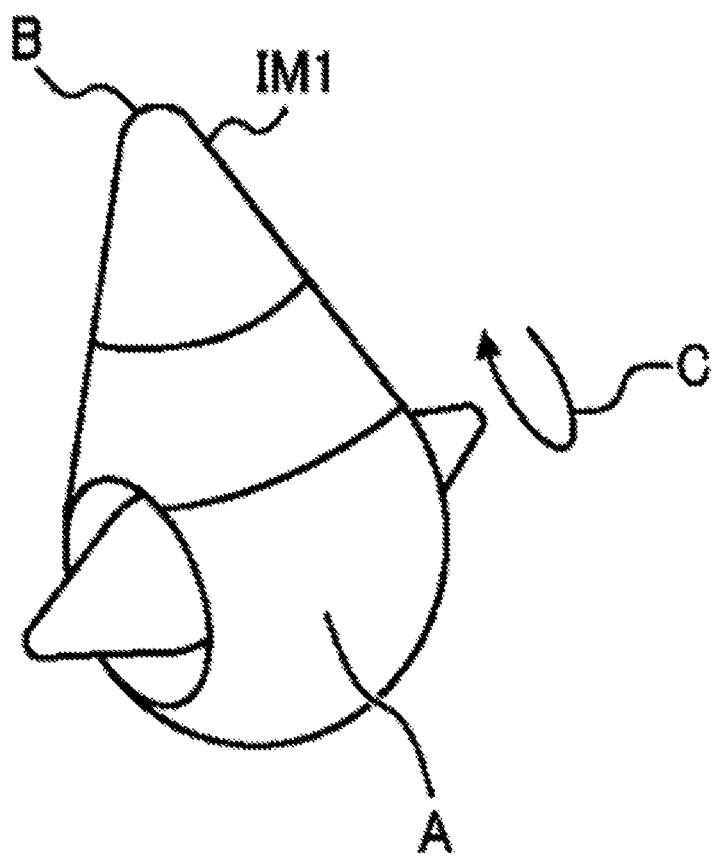
FIG. 4 is a schematic view showing a controller image generated by a composition unit.

The composition unit 135 generates a controller image indicating the position and orientation of the operation device 22 included in the controller information obtained by the controller information acquisition unit 131. FIG. 4 is a schematic view showing a controller image IM1 generated by the composition unit 135. The controller image IM1 is an image indicating the position or orientation of at least one of the fingertip or the wrist of the operator U holding the operation device 22, corresponding to the position and orientation included in the controller information.

For example, the composition unit 135 calculates the central position A of the wrist by adding or subtracting a predetermined correction value to or from the position of the operation device 22. For example, the composition unit 135 calculates the orientation B of the fingertip or the angle C of the wrist by adding or subtracting the predetermined value to or from the orientation of the operation device 22. The composition unit 135 generates the controller image IM1 indicating the central position A of the wrist, the orientation B of the fingertip, and the angle C of the wrist that have been calculated.

The controller image IM1 illustrated in FIG. 4 shows the central position A of the wrist by a position of a spherical portion, the orientation B of the fingertip by the orientation of a front end connected to the spherical portion, and the angle C of the wrist by the rotation angle of the spherical portion. The controller image IM1 may not necessarily be represented by the method described herein. The central position A of the wrist, the orientation B of the fingertip, and the angle C of the wrist may be represented by other methods.

The composition unit 135 generates the composite image data by superimposing the generated controller image on an area corresponding to the movable segment on the capture image data. The area corresponding to the movable segment on the capture image data refers to coordinates on the image capture data corresponding to the computational position and orientation of the movable segment identified by the identification unit 134. For example, the composition unit 135 computes the coordinates on the capture image data by converting the computational position and orientation of the movable segment according to predetermined rules. The composition unit 135 superimposes the controller image on the coordinates on the calculated capture image data. In this manner, even if the operator U cannot view the operation device 22, the data processing apparatus 1 can make the operator U recognize the position and orientation of the operation device 22.

In the case where the movable segment has moved, i.e., in the case where the position or the orientation of the movable segment has changed, the composition unit 135 moves the controller image to the area corresponding to the movable segment after movement on the capture image data. In this manner, the data processing unit 1 can make the controller image follow the movable segment and make the operator U recognize that the controller image is displayed according to the position and orientation of the operation device 22.

Further, the composition unit 135 superimposes the operation image indicating the state where the operation device 22 is operated, on the capture image data, in association with the controller image. For example, the composition unit 135 superimposes an operation image showing one or each of a plurality of buttons of the operation device 22 to an area adjacent to the controller image, and changes the display mode of the operation image depending on whether the one or the plurality of buttons have been pressed or not based on the controller information. In this manner, even in the state where the operator U cannot view the operation device 22, the data processing apparatus 1 can make the operator U recognize the operation state of the operation device 22. Further, even in the state where the movable segment of the robot 3 is hidden by the body of the robot 3 itself or by any other object, the data processing apparatus 1 shows the controller image and the operation image to the operator U to make the operator U recognize the position and orientation of the movable segment of the robot 3, and the operation state of the movable segment of the robot 3.

The display control unit 136 transmits the display data including the composite image data generated by the composition unit 135 to the operation controller 2 through the communication unit 11 to display the composite image data on the display deice 21 which is viewable by the operator U.

Figure 5:
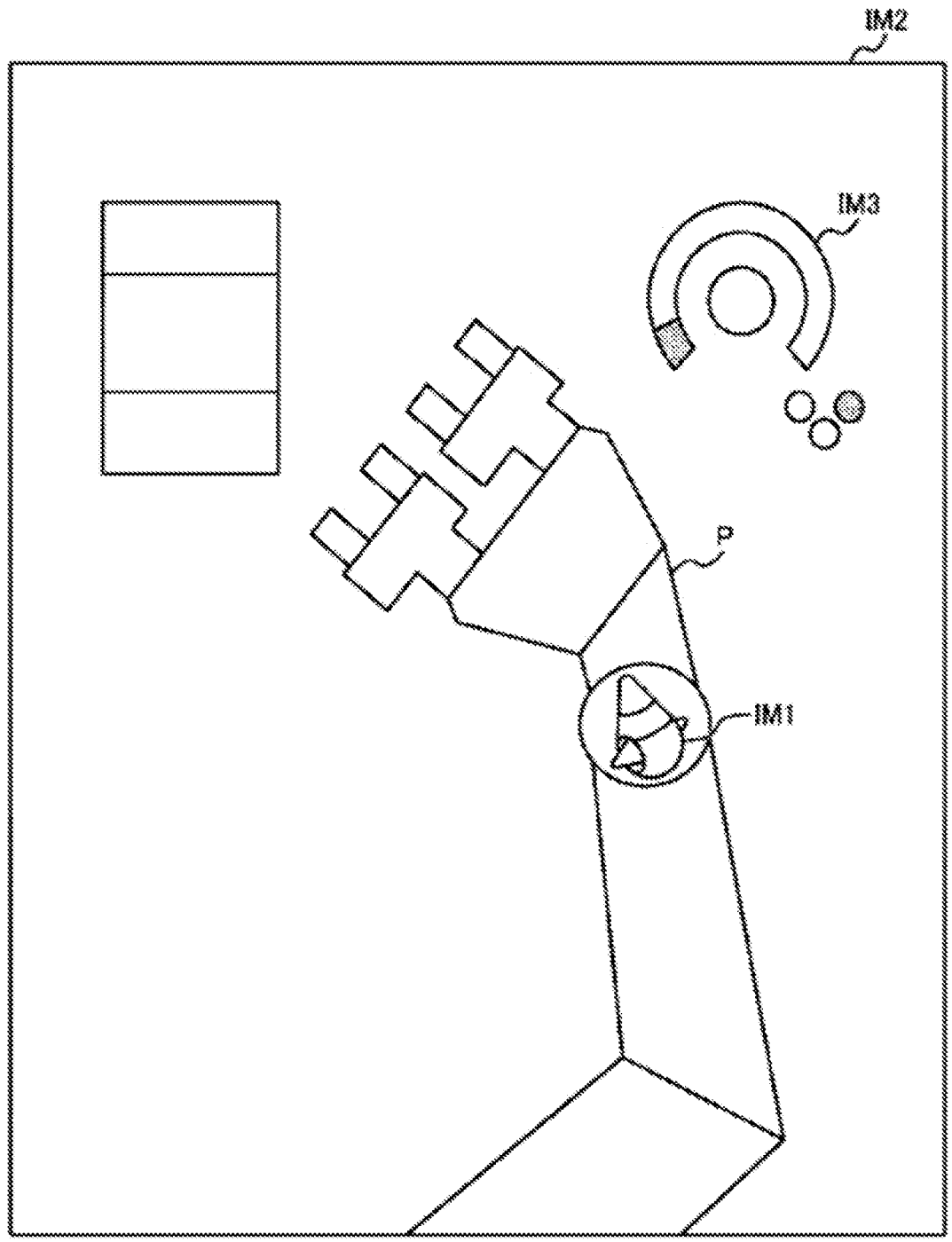
FIG. 5 is a schematic view showing composite image data displayed on a display device.

FIG. 5 is a schematic view of composite image data IM2 displayed on the display device 21. In the composite image data IM2, the controller image IM1 is displayed in the area corresponding to the movable segment P. Further, in the composite image data IM2, an operation image IM3 is displayed adjacent to the controller image IM1. Even in the state where the operator U cannot view the operation device 22, the operator U can recognize the position and orientation of the operation device 22 easily, and recognize the operation state of the operation device 22 by viewing the composite image data IM2 easily.

Figure 6:
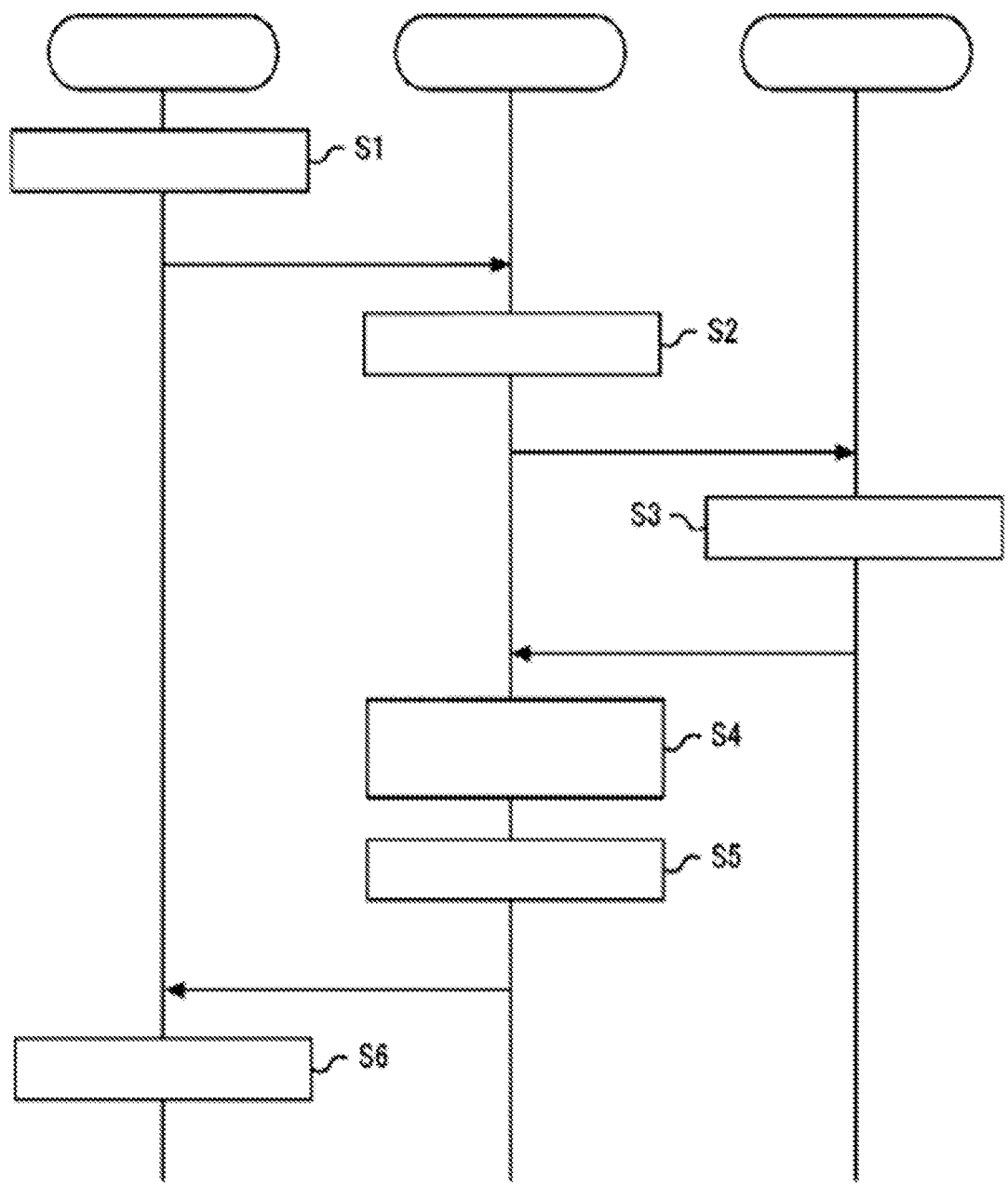
FIG. 6 is a sequence diagram showing a data processing method performed by the data processing system.

FIG. 6 is a sequence diagram showing a data processing method performed by the data processing system. When the operator U operates the movable segment of the robot 3 using the operation device 22, the operation device 22 generates operation data indicating movement of hands and arms of the operator U (hand/arm operation data) (S1). The operation device 22 transmits the generated data to the data processing apparatus 1 through the communication unit 23.

In the data processing apparatus 1, the controller information acquisition unit 131 receives operation data from the operation device 22 through the communication unit 11, and obtains the received operation data as controller information including the position and the orientation of the operation device 22. The controller information acquisition unit 131 inputs the obtained controller information to the operation control unit 132, the image data acquisition unit 133, and the identification unit 134.

The operation control unit 132 generates control data for operating the robot 3, based on the controller information inputted from the controller information acquisition unit 131 (S2). The operation control unit 132 transmits the generated control data to the robot 3 through the communication unit 11.

The robot 3 receives the control data from the data processing apparatus 1, and operates the movable segment according to the received control data. Further, after the robot 3 operates the movable segment according to the control data received from the data processing apparatus 1, the robot 3 may transmit feedback information indicating that the robot 3 operated according to the control data (e.g., ACK information) to the data processing apparatus 1. The data processing apparatus 1 stores the feedback information received from the robot 3 in the memory unit 12.

The camera 31 generates the capture image data by image capturing of the movable segment while the movable segment is operated (S3). The image transmission unit 32 transmits the capture image data generated by the camera 31 to the data processing apparatus 1.

In the data processing apparatus 1, the image data acquisition unit 133 obtains the capture image data generated by the camera 31 from the robot 3. The identification unit 134 identifies the computational position and orientation of the movable segment of the robot 3, based on the position and orientation of the operation device 22 included in the controller information (S4).

The composition unit 135 generates controller image indicating the position and orientation of the operation device 22 included in the controller information obtained by the controller information acquisition unit 131. The composition unit 135 superimposes the generated controller image on the area corresponding to the movable segment on the capture image data, to generate the composite image data (S5).

The display control unit 136 transmits display data including the composite image data generated by the composition unit 135 to the operation controller 2 through the communication unit 11. In the operation controller 2, the display device 21 displays the composite image data received from the data processing apparatus 1 through the communication unit 23 (S6).

Figure 7:
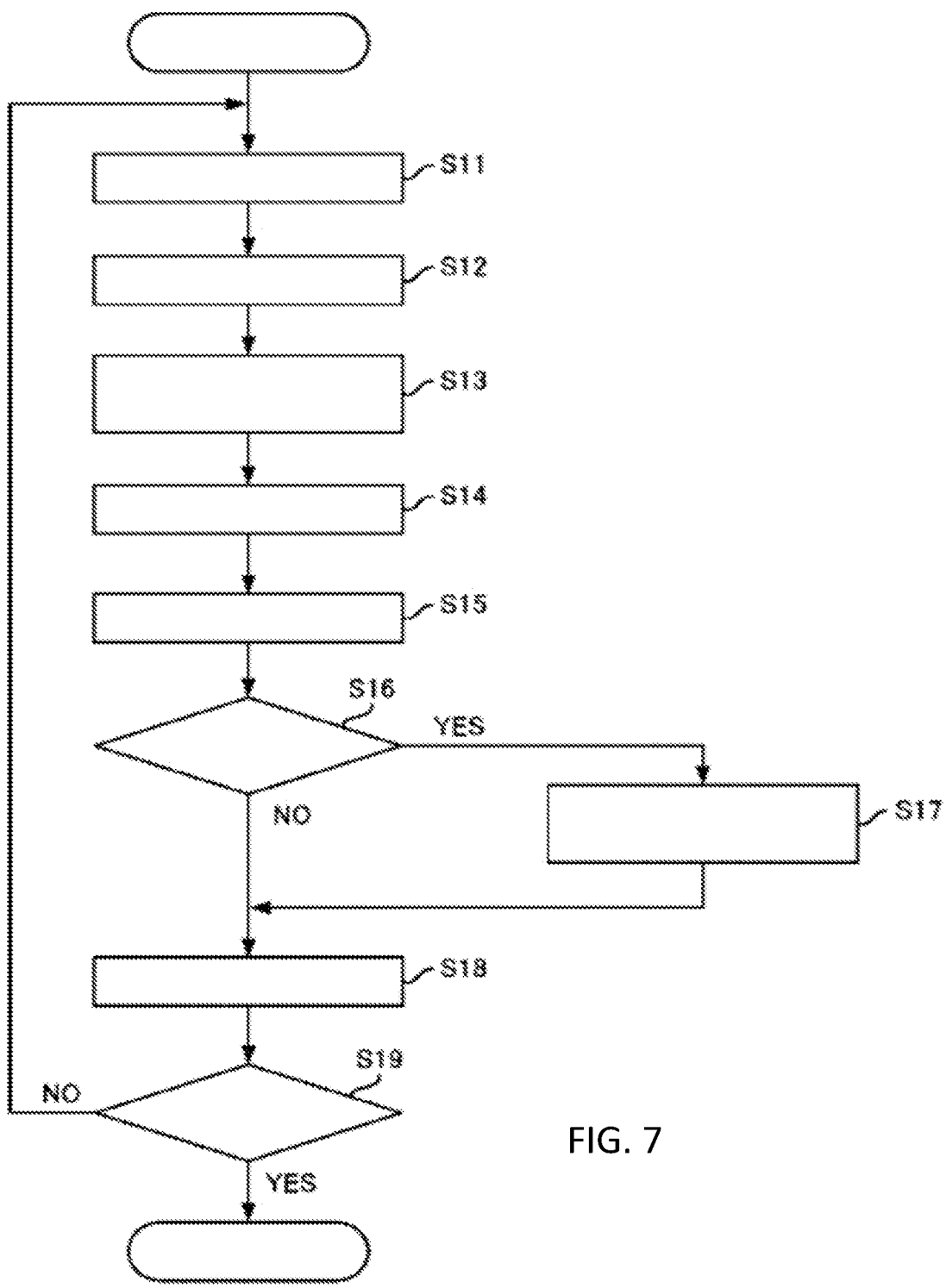
FIG. 7 is a flow chart showing the data processing method performed by the data processing apparatus.

FIG. 7 is a diagram showing a flow chart of the data processing method performed by the data processing apparatus 1. The flow chart shown in FIG. 7 starts from the time point when the operation controller 2 is turned on.

The controller information acquisition unit 131 receives operation data from the operation device 22 through the communication unit 11, and obtains the received operation data as controller information including the position and orientation of the operation device 22 (S11). The image data acquisition unit 133 obtains the capture image data generated by the camera 31, from the robot 33 (S12). S11 and S12 may be performed in reverse order or in parallel.

The identification unit 134 identifies the computational position and orientation of the movable segment of the robot 3, based on the position and orientation of the operation device 22 included in the controller information (S13). The composition unit 135 generates controller image indicating the position and orientation of the operation device 22 included in the controller information obtained by the controller information acquisition unit 131 (S14). The composition unit 135 superimposes the generated controller image on the area corresponding to the movable segment of the capture image data, to generate the composite image data (S15). Further, the composition unit 135 superimposes the operation image indicating one or each of a plurality of operation images of the operation device 22 adjacent to the controller image.

If the controller information indicates that any one of, or any of the plurality of buttons has been pressed (YES in S16), the composition unit 135 changes the display mode of the operation image corresponding to the button, based on the controller information (S17). In the case where the controller information does not indicate that any one of, or any of a plurality of buttons have been pressed (NO in S16), the composition unit 135 does not change the display mode of the operation image.

The display control unit 136 transmits the display data including the composite image data generated by the composition unit 135 to the operation controller 2 through the communication unit 11 (S18). The control unit 13 repeats the process from S11 to S18, in the period until the operator U operates to finish operation at the operation controller 2 (NO in S19). In the case where the operator U operated to finish operation, (YES in S19), the control unit 13 finishes the process.

In the data processing system S according to the embodiment, the data processing apparatus 1 displays the composite image data generated by superimposing the controller image indicating the position and orientation of the operation device 22 on the area corresponding to the movable segment on the capture image data generated by the camera 31, on the display device 21. In this manner, even in the state where the operator U cannot view the operation device 22 at hand, in the capture image data, it is possible to recognize the movable segment of the robot 3 and the controller image corresponding to the operation device 22 which are associated with each other. Therefore, it becomes easy for the operator U to operate the robot 3.

In the above embodiment, since motors and gears, etc. used for operation of the robot 3 have errors, the computational position of the movable position calculated based on the position and orientation of the operation device 22 may be deviated from the actual position of the movable segment. In the data processing system S in the modified embodiment, deviation (difference) between the actual position of the movable segment and the computational position of the movable segment is displayed to enable the operator U to operate the robot 3 more easily. Hereinafter, differences from the above described embodiment will be mainly described.

The identification unit 134 identifies the computational position and orientation of the movable segment of the robot 3 in the above described method, and additionally, identifies the actual position and orientation of the movable segment of the robot 3. The identification unit 134 performs a known image recognition process, and extracts an area in the capture image data, which is similar to image patterns of the movable segment in predefined various orientations. The identification unit 134 identifies the position of the area similar to a certain image pattern in the capture image data, as the actual position of the movable segment, and identifies orientation corresponding to the image pattern, as the actual orientation of the movable segment.

Further, the identification unit 134 may calculate the position and orientation of the movable segment by sensors provided for the operation controller 2 or the movable segment, and identify the calculated position and orientation as the actual position and orientation. The sensor for identifying the position of the movable segment is, for example, an angle sensor provided for each of a plurality of joints of the movable segment. The identification unit 134 obtains angles of the plurality of joints of the movable segment from the angle sensor, and identifies the actual position and orientation of the movable segment, based on the obtained angles and predefined structure of the movable segment (e.g., the length of the arm).

The identification unit 134 identifies the difference between the actual position and orientation of the movable segment and the computational angle and orientation of the movable segment. The identification unit 134 identifies a vector oriented from the actual position of the movable segment to the computational position of the movable segment as a difference of the position. Further, the identification unit 134 identifies an angle between the actual orientation of the movable segment and the computational orientation of the movable segment as a difference of the orientation.

The display control unit 136 displays the difference between the actual position and orientation of the movable segment and the computational position and orientation of the movable segment, in association with the controller image on the composite image data displayed on the display device 21. For example, the display control unit 136 superimposes a difference image including a message indicating the amount and orientation of the difference between the actual position and orientation of the movable segment and the computational position and orientation of the movable segment on the composite image data, and display the superimposed image. Further, the composition unit 135 may superimpose the controller image on the coordinates on the capture image data, corresponding to the actual position and orientation of the movable segment, instead of the computational position and orientation of the movable segment.

Figure 8:
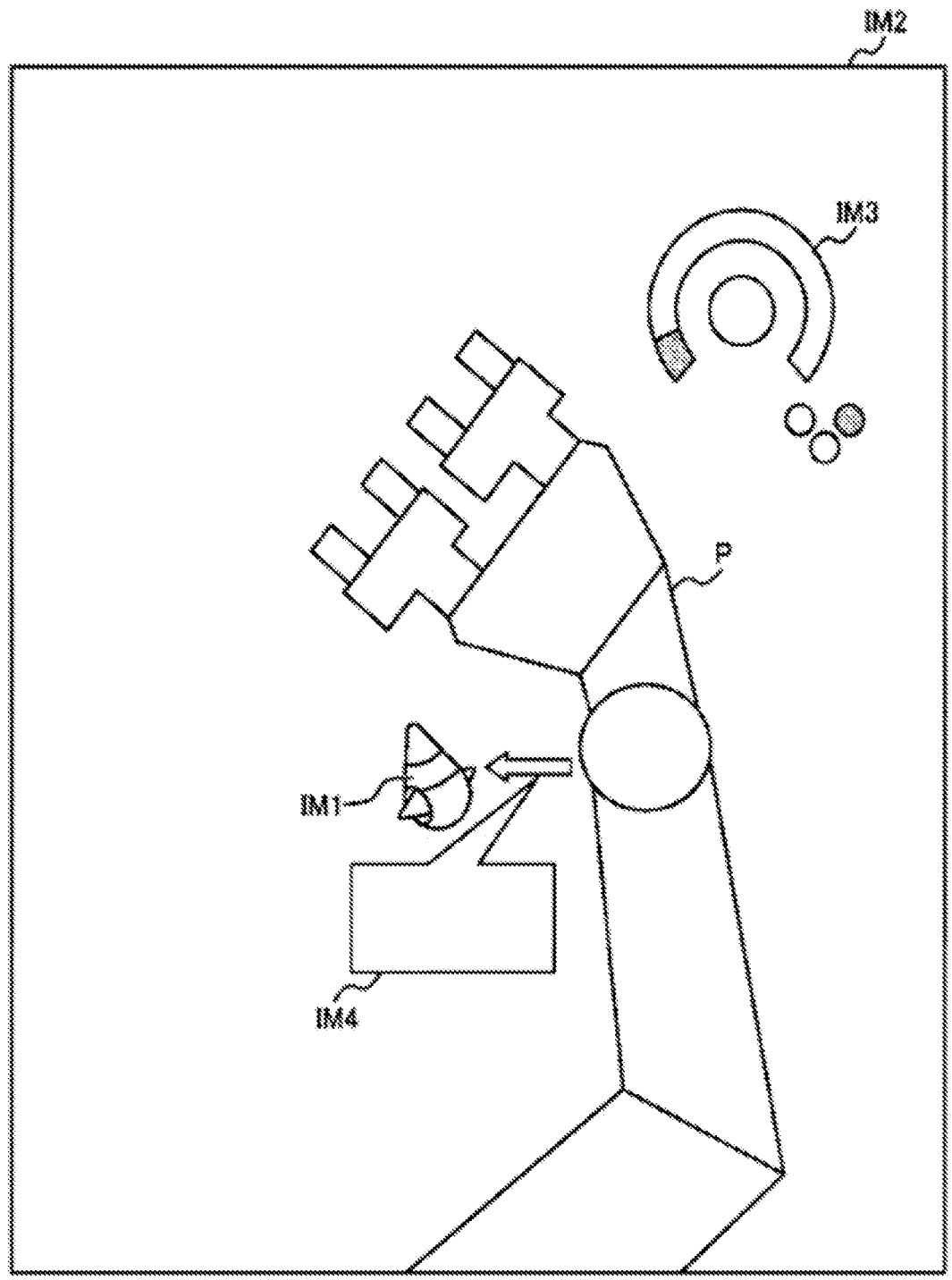
FIG. 8 is a schematic view showing composite image data displayed on the display device.

FIG. 8 is a schematic view showing composite image data IM2 displayed on the display device 21. In the composite image data IM2, a difference image IM4 including a message indicating a difference is displayed adjacent to the controller image IM1. The display control unit 136 may display the difference by displaying an arrow indicating the amount and orientation of the difference instead of or in addition to the message, or by changing the color of the controller image IM1 depending on the degree of the difference. By viewing the difference image IM4, the operator U can easily recognize the difference between the actual position and orientation of the movable segment and the computational position and orientation of the movable segment.

On condition that the difference is not more than a predetermined value, the operation control unit 132 may operate the movable segment in accordance with the position and orientation included in the controller information. That is, the operation control unit 132 permits the operator U to control the movement of the robot 3 when the difference is not more than the predetermined value, and does not permit the operator U to control movement of the robot 3 when the difference is more than the predetermined value. In this manner, the data processing apparatus 1 does not move the robot 3 in the case where the deviation between the actual position and orientation of the movable segment and the computational position and orientation of the movable segment is large. Therefore, improvement in safety is achieved.

Further, the display control unit 136 may change the display mode (color, pattern, etc.) of the composite image data depending on the state in which control of the movement of the robot 3 by the operator U is permitted and the state in which control of the movement of the robot 3 by the operator U is not permitted. In this manner, the data processing apparatus 1 can make the operator U recognize that the robot 3 will not move in the case where the deviation is large.

After the data processing apparatus 1 displays the difference on the display device 21, the data processing apparatus 1 may accept correction of the difference from the operator U. For example, in the case where the operator U operates to start correction at the operation device 22, the operation control unit 132 temporarily stops control of the movable segment, and the controller information acquisition unit 131 accepts operation to move the position of the controller image from the operation controller 2. In the state where the position of the controller image matches the position of the movable segment, the operator U operates to stop correction at the operation device 22. The controller information acquisition unit 131 stores the amount and orientation the controller image is moved at the time of correction, as a correction amount in the memory unit 12.

Further, in the case where the operator U operated to start correction on the operation device 22, the composition unit 135 may temporarily fix the position of the controller image, and accept operation to move the movable segment from the operation controller 2. In the state where the position of the movable segment matches the position of the controller image, the operator U performs operation to stop correction at the operation device 22. The controller information acquisition unit 131 stores the amount the movable segment has moved at the time of correction and the orientation of the movable segment, as a correction amount in the memory unit 12.

Thereafter, the operation control unit 132 adds or subtracts the correction amount stored in the memory unit 12 to or from the position and orientation indicated by the controller information to generate control data. In this manner, the data processing apparatus 1 can correct deviation between the actual position and orientation of the movable segment and the computational position and orientation of the movable segment.

Further, the data processing apparatus 1 may automatically make correction corresponding to the difference identified by the identifying unit 134, to the position and orientation of the operation device 22 indicated by the controller information. The correction of the difference includes correction of movement of the robot 3 and correction of the position of the controller image. In the case of correcting movement of the robot 3, for example, the operation control unit 132 generates control data by adding or subtracting the value of the difference identified by the identification unit 134 to or from the position and orientation indicated by the controller information. In this manner, the movement of the robot 3 is corrected in correspondence with the difference.

In the case of correcting the position of the controller image, the composition unit 135 superimposes the controller image, at the position the value of the difference identified by the identification unit 134 is added to or subtracted from the coordinates on the capture image data corresponding to the computational position and orientation of the movable segment. In this manner, the position of the controller image is corrected in correspondence with the difference. Thus, the data processing apparatus 1 can correct the deviation between the actual position and orientation of the movable segment and the computational position and orientation of the movable segment.

In the above embodiment, the data processing apparatus 1 displays the operation image indicating the state where the operation device 22 is operated, on the display device 21. In contrast, in the modified embodiment, the data processing apparatus displays a proposed image indicating operation to be performed next by the operation device 22. Hereinafter, differences from the above described embodiment will be mainly described.

The memory unit 12 stores, in advance, task schedule information including one or a plurality of task contents which are scheduled to be performed by the operator and operation performed for the robot for the one or each of the plurality of task contents associated with each other. The identification unit 134 obtains task schedule information from the memory unit 12, before the composition unit 135 generates composite image data. The identification unit 134 identifies the task contents scheduled to be performed by the operator U next based on the task schedule information.

For example, the identification unit 134 identifies the task content scheduled to be performed next, from one or the plurality of task contents indicated by the task content information, by receiving the input of the task progress from the operation device 22. The identification unit 134 identifies operation associated with the task content scheduled to be performed next, in the task schedule information.

The composition unit 135 superimposes operation image indicating the state where the operation device 22 is operated, in association with the controller image, on the capture image data. Further, the composition unit 135 superimposes a proposed image indicating operation to be performed next at the operation device 22, in correspondence with the task content identified by the identification unit 134. For example, operation to be performed next at the operation device 22 is operation of changing to the fingertip portion of the robot 3 used in the task content scheduled to be performed next. The proposed image is an image showing a message which explains operation to be performed next at the operation device 22. Further, the composition unit 135 may superimpose task content information indicating the task content scheduled to be performed next, on the capture image data.

The display control unit 136 displays the composite image on the display device 21 viewable by the operator U, by transmitting the display data including the composite image data generated by the composition unit 135 to the operation controller 2 through the communication unit 11, to display the composite image data on the display device 21 viewable by the operator U.

Figure 9:
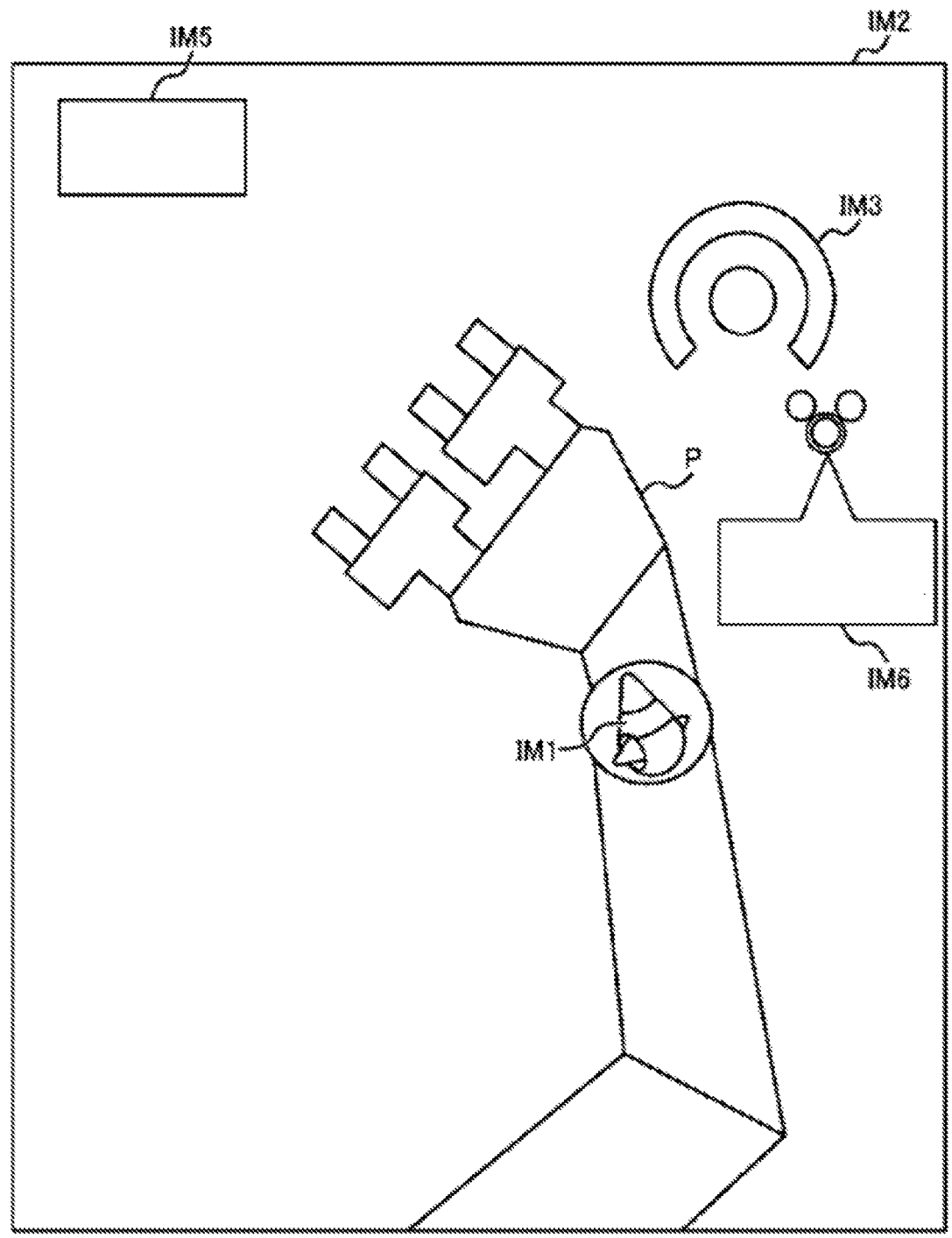
FIG. 9 is a schematic view showing composite image data displayed on the display device.

FIG. 9 is a schematic view showing composite image data IM2 displayed on the display device 21. In the composite image data IM2, an operation image IM3 is displayed adjacent to the controller image IM1. Further, in the composite image data IM2, task information IM5 indicating the task content scheduled to be performed next is displayed, and a proposed image IM6 indicating operation to be performed next, at the operation device 22 is displayed adjacent to the operation image IM3. In this manner, the data processing apparatus 1 can propose operation in accordance with the task content scheduled to be performed next, for the operator U and facilitate the progress of the task.

Although the present invention has been described above using the embodiments, the technical scope of the present invention is not limited to the scope described in the above embodiments, and various modifications and changes can be made within the scope of the gist of the present invention. For example, all or part of the apparatus, in any unit, can be configured to be functionally or physically distributed or integrated. Any new form of embodiments derived from any combination of a plurality of embodiments is also encompassed within the embodiments of the present invention. The effect of the new form of embodiment derived from combination of embodiments has the effect of the original embodiments as well.

The invention claimed is:

1. A data processing apparatus for processing data for operating a movable segment of a machine in correspondence with a position of a controller, the data processing apparatus comprising a processor configured to:
obtain controller information including the position, when an operator operates the movable segment using the controller;
obtain capture image data generated by image capturing of the movable segment while the movable segment is operated depending on the position;
generate composite image data by superimposing a controller image indicating the position included in the controller information, on an area corresponding to the movable segment on the capture image data;
display the composite image data on a display device viewable by the operator; and
identify a difference between an actual position of the movable segment and a computational position of the movable segment calculated based on the position included in the controller information.

2. The data processing apparatus according to claim 1, wherein the processor is configured to obtain the controller information including orientation of the controller in addition to the position; and
generate the composite image data by superimposing the controller image indicating the position and orientation included in the controller information.

3. The data processing apparatus according to claim 2, wherein the controller image is an image indicating a fingertip or a wrist of the operator holding the controller, corresponding to the orientation included in the controller information.

4. The data processing apparatus according to claim 1, wherein, in the case where the movable segment moved, the control unit is configured to superimpose the controller image on an area corresponding to the movable segment after movement, on the capture image data.

5. The data processing apparatus according to claim 1, wherein the processor is configured to associate an image indicating the state where the controller is operated with the controller image, and superimpose the image indicating a state where the controller is operated with the controller image on the capture image data.

6. The data processing apparatus according to claim 1, wherein the processor is configured to superimpose an image indicating operation to be performed next, for the controller, according to task content scheduled to be performed next by the operator, on the capture image data.

7. The data processing apparatus according to claim 1, wherein the processor is configured to:
obtain the controller information including the orientation of the controller in addition to the position; and
identify a difference between actual position and orientation of the movable segment and computational position and orientation of the movable segment based on the position and the orientation included in the controller information.

8. The data processing apparatus according to claim 1, wherein the processor is configured to associate the difference with the controller image, and display the difference on the display device.

9. The data processing apparatus according to claim 1, wherein the processor is configured to further perform operation of the movable segment in correspondence with the position included in the controller information, after making correction corresponding to the difference for the position included in the controller information.

10. The data processing apparatus according to claim 9, wherein, on condition that the difference is not more than a predetermine value, the processor is configured to operate the movable segment in correspondence with the position included in the controller information.

11. A data processing method for processing data for operating a movable segment of a machine in correspondence with a position of a controller, the method comprising:
obtaining controller information including the position, when an operator operates the movable segment using the controller;
obtaining capture image data generated by image capturing of the movable segment while the movable segment is operated depending on the position;
generating composite image data by superimposing a controller image indicating the position included in the controller information, on an area corresponding to the movable segment on the capture image data;
displaying the composite image data on a display device viewable by the operator; and
identifying a difference between an actual position of the movable segment and a computational position of the movable segment calculated based on the position included in the controller information.

12. A non-transitory computer program product having computing program instructions thereon wherein the computing program instructions when executed by a computer, configure the computer to:
process data for operating a movable segment of a machine in correspondence with a position of a controller;
obtain controller information including the position, when an operator operates the movable segment using the controller;
obtain capture image data generated by image capturing of the movable position while the movable position is operated in correspondence with the position;
generate composite image data by superimposing a controller image indicating the position included in the controller information, on an area corresponding to the movable segment on the capture image data;
display the composite image data on a display device viewable by the operator; and
identify a difference between an actual position of the movable segment and a computational position of the movable segment calculated based on the position included in the controller information.

13. A data processing system comprising:
an operation device associated with a controller for operating a machine; and
a data processing apparatus for processing data for controlling a movable segment of the apparatus in correspondence with the position of the controller,
wherein the data processing apparatus has a processor configured to:
obtain controller information including the position, when an operator operates the movable segment using the controller;
obtain capture image data generated by image capturing of the movable segment while the movable segment is operated in correspondence with the position;

generate composite image data by superimposing a controller image indicating the position included in the controller information, on an area corresponding to the movable segment on the capture image data;
display the composite image data on a display device viewable by the operator; and
identify a difference between an actual position of the movable segment and a computational position of the movable segment calculated based on the position included in the controller information;
and wherein the operation controller comprises:
a communication unit configured to transmit the controller information based on contents of operation by the operator, to the data processing apparatus; and
a display unit viewable to the operator, and configured to display the composite image data transmitted by the data processing apparatus.

* * * * *